Patented Apr. 23, 1940

2,198,165

UNITED STATES PATENT OFFICE 2,198,165

PREPARATION CONTAINING CALCIUM COMPOUNDS

Lodewijk Hamburger, Scheveningen, Netherlands

No Drawing. Application April 19, 1937, Serial No. 137,799. In Great Britain April 28, 1936

17 Claims. (Cl. 167—68)

My invention relates to preparations which contain calcium compounds, and more particularly to stable, preferably non-hygroscopic preparations containing two per cent or more of a soluble organic calcium compound such as calcium lactate or double compounds of calcium lactate with other salts, calcium gluconate, double compounds of calcium chloride with organic compounds and the like.

As is well known, there is often a deficiency of calcium in the diet of large numbers of the population, especially if their milk consumption is somewhat limited. A cheap and satisfactory means of supplying a satisfactory substitute to meet this deficiency is therefore very desirable. In spite, however, of the fact that a large number of calcium preparations are on the market, the supply is still far from satisfactory, as no one hitherto succeeded in producing on a commercial scale calcium containing preparations in which the disagreeable taste of the soluble calcium salts is sufficiently eliminated in an inexpensive manner. In this respect it should be noted that an adequate quantity of calcium should be consumed several times every day, and that such frequent and regular consumption will be rendered possible only if the preparations can be sold at a low price and have a sufficient nutritive value, whilst satisfying severe requirements as to taste.

Obviously some attention must also be paid to homogeneity of the preparation as lack of homogeneity may cause the occurrence of local excess concentrations of the calcium compound, which may impair the taste and assimilation capacity. Again, when there is such lack of homogeneity that hard, more or less acute-angled crystals (or crystal aggregates) are present, the human touch receptors will be irritated, and the consumers are then likely to complain of a sandy taste. In cases, therefore, in which segregation of calcium compounds in solid form cannot be prevented, this segregation should be made to take place in such a way that particles are formed of a non-troublesome shape and size, e. g. in the form of extremely fine rounded particles embedded in a viscous medium.

Rational processes for the production of thoroughly satisfactory preparations containing assimilable calcium compounds must therefore make use of means, for preventing crystallisation or segregation, in a more or less coarse form, of calcium compounds primarily brought into solution (or a state of fine division) and for adequately correcting the calcareous taste.

I have found that this desideratum can largely or entirely be satisfied by the use of a suitable viscous medium, the viscosity of which, in the absence of substances which make for an acid taste, is more than a hundred times as great as that of water. Viscosity, however, is not the only condition that must be taken into consideration. In this respect it is interesting to note on the one hand that viscosity is of less significance in an acid medium, and on the other that e. g. a gelatine gel containing for instance 2% or 4% gelatine, in which a calcium compound such as calcium lactate is dissolved, has a very disagreeable taste, although the viscosity of the preparation is extremely high.

I have found that the calcareous taste of solutions containing calcium compounds depends largely upon the concentration of ions of these compounds. On the one hand this concentration may be diminished by the use of calcium compounds containing organic radicals which compounds are less readily dissociated electrolytically and are more readily adsorbed by adsorbing agents to which I shall presently refer. On the other hand the activity of ions of the calcium compound or compounds may be diminished by the reduction of the quantity of non-chemically bound water in the preparation, since of several preparations having equal percentages of calcium compounds the one having the smallest water content will show the least electrolytic dissociation or ionic mobility. I have found that even in case of a high content of calcium compounds surprising results may often be obtained by keeping the concentration of non-chemically bound water below 30% by weight. This applies more especially to preparations free from substances that make for an acid taste and which owe part of their viscosity to the presence either of semi-colloids or of colloids with lyophilic properties.

It is also necessary to avoid using substances which combine chemically with the calcium compounds in such a way that large or acute-angled crystal aggregates segregate. For example, a concentrated solution of saccharose is open to objection owing, inter alia, to the fact that in the presence of calcium compounds which show a neutral reaction with phenolphthalein and are dissolved at high concentrations, it will, in the long run, be largely or entirely transformed into a segregating calcium saccharate which ultimately renders the bulk of the preparation as hard as stone (c. f. W. Reinders and D. W. van Gelder, Rec. Trav. chim. d. Pays-Bas 51, 253 (1932)). Solutions of saccharose, saturated at room temperature, have moreover a water content of more than 30%. Apart from the fact that these solutions are hygroscopic, unstable and perishable, the ionic activity of the calcium compound will, owing to said water content, also tend to be too high in the freshly prepared solution, which applies very markedly before a segregation of insoluble calcium saccharate takes place. Hence a bad taste will be observable in these solutions.

In the case where calcium compounds, the solutions of which are neutral in respect of indicators such as phenolphthalein or neutral red, are the only electrolytes in the preparation, I have found that for the purpose of restricting the calciferous taste, the conductivity attributable to the calcium compounds present in the preparation should be less than $1/150$ of the conductivity of a solution of the same calcium compounds dissolved in water to the same concentration, measurements being made under comparable conditions, such as temperature, etc. (1st conductivity criterion).

When there is another electrolyte or a taste producing non-electrolyte in the preparation, these may have a compensating effect on the taste of the calcium present, and the conductivity due to the calcium compounds may then be permitted to increase correspondingly. However, when there is another electrolyte or mixture of electrolytes in the preparation and if the taste compensation is not very marked, I have found that for preparations, which show a neutral character in respect of phenolphthalein as indicator, the proportion of the conductivity of the preparation attributable to the dissolved calcium compounds, multiplied by the equivalent conductivity attributable to the calcium compounds in the preparation, should be less than $1/150$ of the equivalent conductivity of a solution of the same calcium compounds dissolved in water to the same concentration (2d conductivity criterion).

Thus for instance a solution in pure water containing $n$ per cent by weight of a calcium compound has a specific resistance at a given temperature of $a$ ohms. If a solution of the same calcium compound in another medium not containing electrolytes is prepared which also contains $n$ per cent of the said calcium compound, and if the preparation has a specific resistance of $b$ ohms at the same temperature, then in order to fulfill the relevant conductivity condition of this invention, the relation $$\frac{a}{b} < \frac{1}{150}$$

must be satisfied, provided the calcium compound reacts neutrally with phenolphtalein.

Supposing a medium containing a neutral electrolyte to have a specific resistance of $c$ ohms, and an $n$ per cent solution of a calcium compound in this medium to have a specific resistance of $d$ ohms, then, neglecting the conductivity of pure water—and in the absence of chemical reactions, or complicating adsorption-phenomena —the contribution $x$ of the calcium compound to the specific resistance of the solution is expressed by the equation $$\frac{1}{d} = \frac{1}{c} + \frac{1}{x} \text{ or } x = \frac{cd}{c-d} \quad (1)$$

Presuming that when the calcium compound is dissolved in the medium containing an electrolyte—the taste compensation of which is not very marked—the specific resistance of the solution is lowered, then in order to fulfill the relevant conductivity condition of this invention the following relationship must be satisfied:

$$\frac{d}{x}\cdot\frac{k}{x} < \frac{1}{150}\cdot\frac{k}{a} \quad (1)$$

(where $k$ is a constant) or $$\frac{d}{x}\cdot\frac{a}{x} < \frac{1}{150} \quad (2)$$

Chemical reactions or adsorption (exchange) phenomena may give rise to complications, and even incidentally to cases for which $d>c$. For those practical purposes, however, with which I am concerned here, it may conveniently be stipulated simply to apply Equation (1) indiscriminately for all cases where $d<c$, and further to consider the second conductivity criterion as being satisfied also when $d>c$.

As to the connection between the first and the second conductivity criterion it may further be observed that in the absence of other electrolytes than calcium salts one may put $d=x=b$, or $$\frac{d}{x^2} = \frac{1}{b}$$

so that the second conductivity criterion then changes over into the first one.

I find the admissible conductivity limit, however, to substantially shift towards larger values in the presence of acids or acid salts. I am inclined to connect part of this feature with the fact that the taste of solutions of organic acids—and of their acid salts—is many times—in some cases even many scores of times—more acid than corresponds with their electrolytic dissociation. It has been thought in turn that this might be imputed to the fact that the electrolytic dissociation of these acids, and acid salts, is very incomplete, even in very diluted solutions, whilst it is further assumed that the perception of an acid taste is accompanied by an elimination of hydrogen ions. These ions then, in so far as they are used up, can be very well replenished by electrolytically poorly dissociated acids at the expense of their non-dissociated molecules. An outstanding case is that of acid salts of citric acid. In very diluted solutions these may still give rise to a faintly sour or astringent taste at a concentration of hydrogen ions which in extreme cases are still perceptible at a limit that amounts to less than one hundredth part of the limit determined for inorganic acids.

Whatever may be the complete explanation (possibly differences of diffusion velocity of hydrogen ions, or hydronium ions through membranes, as compared with diffusion velocities of ions of calcium compounds, and further specific adsorption-differences of molecules of organic acids, may also be significant), I find that in the case of preparations in which sourly tasting substances are present the above limit of $1/150$ should be multiplied with a factor such that a limit of about $1/2$ may be attained (3d conductivity criterion).

The process of manufacture of preparations containing calcium compounds according to the present invention thus comprises the distribution of one or more soluble calcium compounds containing organic radicals, or of a solution of such compounds, in a liquid which does not combine chemically therewith to form large or acute-angled crystal aggregates, to produce a preparation containing 2 per cent or more of soluble calcium compounds containing organic radicals, the proportion of the total conductivity of the preparation attributable to the dissolved calcium compounds in the preparation being, in the absence of sourly tasting substances, less than 1/150 of the equivalent conductivity of a solution of the same calcium compound in water at the same temperature and concentration, whereas this limit may be as high as ½ if a sour taste prevails.

Amongst the substances which can be employed for the preparation I have found those which contain isostable lyophilic colloids to be in general, particularly suitable. These colloids or preparations are relatively resistant against the flocculative action of ions in general and of neutral calcium compounds in particular, even if the water content of the preparation is low. Also colloid systems may be effective in which lyophilic colloids are acting as protective means ensuring a greater stability of the preparation. More particularly I prefer to use materials which may be considered as mixtures of colloids of divergent particle sizes, such mixtures often yielding favorable results in respect of viscosity and of adsorption, absorption, or chemical combination and especially so when the water content is kept low so that conditions are realised which entail low concentrations and/or a low mobility of active ions.

The application of colloids generally further involves the advantage that substances in colloid form hardly ever exhibit an outspoken taste. If used in high concentration, colloid substances tend to act in a mild way. Even if in case of such large concentrations and owing to a low water percentage of the preparations a crystallisation of calcium salts from oversaturated solutions cannot be prevented, I still find under these conditions a tendency of the solid phase of the calcium compounds to be separated in a state of very fine subdivision, and to remain uniformly distributed throughout the medium. The tiny particles uniformly embedded in the colloid system and having rounded forms do not irritate the oral tentacles.

Having thus explained in a general way the nature of my invention, I will now proceed to bring out more in detail its particular features with reference to some typical examples.

I. PREPARATIONS WITH A SUBSTANTIAL CONTENT OF SEMI-COLLOIDS

I have found that the unpleasant taste and the tendency of crystallizing which is displayed by certain supersaturated solutions of calcium compounds can be suppressed in a most striking manner for instance with the aid of amylum syrup, in which many kinds of colloid particles are present, or of a medium containing a considerable quantity of dextrine, or of analogous semi-colloids.

In spite of its low water content it is possible to bring doses of a calcium compound such as sodium calcium lactate into solution in a medium like glucose syrup to an extent which can be adjusted to the daily desirable quantity of consumption. In doing so I find that the taste of this syrup is not altered, or hardly so. Such a preparation is moreover, as stable as glucose syrup itself. As an example of such a preparation, it may be stated that, if 100 kilograms glucose syrup are heated on a steam bath and mixed with 10 kilograms calcium sodium lactate, the compound dissolves in the syrup and a product is obtained which is free from any unfavourable taste.

Similar results may be obtained when operating with so called "kitchen syrup" which has a content of about 15% sugar, or so called "household syrup" which has a content of about 30% saccharose. 10 kilograms calcium lactate may be dissolved in 5 liters boiling water and the solution mixed with 100 kilograms of one of these syrups. The preparation when cooled to room temperature is free from a calcareous taste and keeps quite clear permanently. This is a surprising feature as the solution of the calcium salt is greatly supersaturated owing to the low water content of the product.

In this case, it is true, the sugar content may help to mask the taste of the calcium salt. But it is not the presence of the saccharose alone which is decisive, but that of dextrine and its transition products towards glucose. This may be shown in several ways. I find for instance that even pure dextrine, which has not a sweet taste, may be used in addition with a small admixture of water in order to act as a medium for eliminating to a great extent a calcareous taste. On the other hand the most concentrated solution of saccharose in water at room temperature, though rather viscous and very sweet, does not constitute a suitable medium for the reasons given above.

That it cannot be the covering power of the sweet substances in glucose (or kitchen or household syrup) which acts as a decisive factor as regards taste improvements, is also shown by the fact that even if extremely sweet substances, such as solutions of saccharine or of its sodium salt in water, are employed to such an extent that the degree of sweetness of the solution is several times that of the sweetest saccharose solution, all these solutions display a strikingly unpleasant taste in the presence, for instance of dissolved calcium lactate. In conformity with my general proposition I further find that the taste of a freshly prepared solution of saccharose and of a calcium salt in water may become worse by dilution. Thus a solution of 1 gram calcium lactate, 3 grams saccharose and 27 grams water has a taste which is decidedly worse than that of a solution of 1 gram calcium lactate, 3 grams saccharose and only 7 grams water. Though the proportion of salt to sugar does not change, the proportion of the active concentration of salt ions to that of sugar (as well as the mobility of the ions) tends to increase with dilution.

My preference for colloids such as are present in glucose syrup in the form of semi-colloids, is borne out by a comparison of the specific electric conductivity of preparations produced with the aid of this medium, with the conductivity of solutions of calcium compounds in other media. Since a poor conductivity corresponds with a small electrolytic dissociation, or a small ionic mobility, the conductivity of a solution—more particularly in the absence of sourly tasting substances—shows its applicability for the present purpose. I find that the specific electric conductivity of an amylum syrup preparation containing 9.3% calcium lactate at room temperature is about one fourteenth of that of a saturated saccharose solution at the same temperature with a content of about 65% sugar and 9.3% calcium lactate. (In the case of the saccharose solution measurements were made soon after solution of the calcium compoud, i. e., before there would be any question of segregation of an insoluble compound.) I find that the electric conductivity of said amylum syrup preparation is less than one fourteen hundredth of that of a solution of 9.3% calcium lactate in pure water.

Where such features of reduced ionic dissociation or mobility or both apply, the intensity of taste of the preparation, insofar as this taste is due to the calcium compound, is largely reduced, the effect tending to be the more marked, the lower the electric conductivity of the preparation which is attributable to the presence of ions of the calcium compound.

It may further be that part of the influence of the medium on the taste and on the electric conductivity of the product must, in the case of glucose syrup, be imputed to an interaction between the polar groups of dextrines (which semi-colloids are present in amylum syrup to a substantial extent) and ions of the calcium compound(s). At all events it is rather striking that even in the case of household syrup with 30% saccharose the presence of said semi-colloids prevents the formation of crystal aggregates which form when a pure concentrated solution of saccharose is used as medium. The formation of crystal aggregates in the latter case constitutes, as we have seen, one of the objections that make a saccharose solution unsuitable.

The acid component of the calcium salts, mentioned hitherto in the illustrative examples, entirely consists of organic radicals. But already by a partial substitution of inorganic by organic radicals (or by a formation of double compounds between inorganic and organic substances) a certain improvement of taste may be obtained. Thus a substantial remission of the harsh taste of substances such as calcium chloride may be realized by the incorporation of substances such e. g. as glycine.

Suitable double compounds may be added as such or may be formed in situ, during the manufacture of the preparations. In considering the selection of additions suitable for use in the preparation, advantage may be taken of the fact that compounds may be formed between many calcium compounds and nitrogen containing substances. For example compounds may be formed of calcium chloride with urea derivates, or—as I have found—a soluble compound of calcium oxychloride ($CaCl_2.3CaO.16H_2O$) with asparagin. Thus, for instance 3 parts by weight asparagin are dissolved in 6 parts hot water; 2 parts crystallized calcium oxychloride of the composition mentioned above are dissolved in the heated liquid. The hot solution is subsequently mixed for instance with 86 parts corn syrup.

II. PREPARATIONS WITH A CONTENT OF COLLOIDS OTHER THAN SEMI-COLLOIDS

A. *Concentrated sols, gels, suspensions*

Dextrines belong to the class of so-called semi-colloids. Passing on to the more "genuine" colloids, of which I have already mentioned the lyophilic type, a tendency of gel-formation may be met, and this even in case of diluted colloidal systems. In the absence of special measures this complication applies also to solutions of isostable members of hydrophilic colloids, though these are very resistant against flocculative actions of ions. Sols are known, moreover, which show denaturation or degeneration when heated. Unless special precautions are taken, this is the case with many colloid protein solutions.

Though the viscosity of a solution containing a few per cent gelatine—taken as an instance of an isostable hydrophile colloid—and an appreciable content of a calcium salt is considerably increased, when at a given temperature gel formation takes place, this transformation does not appear to be accompanied by a substantial improvement of taste qualities. Actually, as already noted in the beginning, if dissolved calcium lactate is present such a gel has a highly unfavorable taste. I have correspondingly found that a gelatine gel with 2% gelatine and 9.3% dissolved calcium lactate hardly differs in respect of its electrolytic conductivity from an equally strong solution of the calcium salt in pure water. The specific conductivity of the saliferous gel is correspondingly about fourteen-hundred fifty times the specific conductivity of an equally strong solution of the calcium compound in glucose syrup. This result apparently lends substantial support to the conception of the structure of diluted gels as forming an only partially connected meshwork in which the larger part of the water is fixed only by relatively weak forces.

A transformation of diluted sols into gels may even give rise to objectionable features in the presence of supersaturated solutions of calcium salts insofar as by such transformation the crystallization of the calcium compound may be accelerated and the formation of large crystals favored. As a matter of fact the scientific literature mentions that the quiet growth of crystal germs—once they are formed—is a process which can hardly be more favored anywhere than in gels.

In the case however that only a moderate degree of super-saturation of the calcium compound is used and a larger percentage of a colloid is employed which is able to form a soluble true or adsorption compound with calcium ions, the tendency of crystallization may still be diminished even in a gelatinized medium. Thus e. g. the tendency of crystallization of a gel with 8 per cent by weight calcium lactate and 20 per cent gelatine will be insignificant at room temperature, although the preparation will show an insufficient taste correction. Application of a much larger concentration of the calcium compound will lead to a still less satisfactory taste, and if the gelatine content is kept unchanged, the adsorption (or absorption) effect, or effect of chemical combination between the gelatine and the calcium-compound, will become relatively less important, so that crystallization phenomena may actually be generated in the gel at an earlier time than in an equally concentrated solution of the calcium compound in pure water.

More satisfactory results in respect of taste and of tendencies towards crystallization may be obtained, however, if—in conformity partially with the principles which underly the use of a medium like amylum syrup—the colloid is used in a very high concentration. The colloid may further be transformed into a semi-colloid; thus for instance gelatine may be transformed into gelatose. But this transformation is not necessary. Although, if the colloid is used without being transformed into a semi-colloid, gel formation may again increase crystallization tendencies, the water content may this time be kept so low and the toughness of the medium may be made so strong in all its parts (and apply up to microscopical dimensions so that we may speak of a strong "micro-toughness") that a significant effect can still be obtained. This effect will be favoured by a high concentration of the gelatine, owing to its capacity to form a true or adsorption compound with calcium ions. Crystallisation, if occurring at all, remains restricted to the formation of a great number of tiniest germs or of minute particles, whilst even in the long run (and also owing to a lack of growth space) none of these particles gets an opportunity to grow to larger dimensions. Thus a state of finest subdivision is maintained.

The principle involved may be illustrated by the following example: to 4 parts by weight powdered purified gelatine, fit for consumption, two parts water are added and after heating above 80° C. the mass is mixed with a hot solution of 1 part calcium lactate in 1 part water. When manipulating in an open vessel, a large part of the water will evaporate during the production of the preparation, and the process may be conducted in such a way that a product results which—after cooling to room temperature—will contain only 25 to 30 per cent non-chemically combined water. The taste of the composite substance shows the remarkable feature that it hardly differs from the taste of a product with equal gelatine concentration in which no calcium salt is present. Whilst a hot solution of one part by weight calcium lactate in three parts water rapidly crystallizes on cooling, entailing solidification of the entire mass, the segregation of calcium salt in the gelatine medium with a poor water content proceeds only relatively slowly and as mentioned above, not beyond a state of finest division. As the tiniest particles remain distributed over and embedded in the entire mass of the tough colloid system, the oral tentacles will not be influenced in a way which substantially differs from the effects produced by similar tough products in which calcium salts are lacking.

Another instance of a concentrated colloidal system which suits my purpose in conformity with the principles on which my invention is based, is a system, part of which consists of latex or of some other caoutchouc preparation (balata, gutta-percha), either in the form of more or less concentrated and purified vegetable milk saps (or products thereof), or in the form of synthetic rubber products. Colloid rubber particles are not of a hydrophile nature; but in the case of latex, e. g., the medium of dispersion (serum or latex) contains a number of substances—such as proteins and resins—with strong adhesive properties. Again flocculated rubber sols may partially or entirely be peptisized in any suitable way. Thus mixtures may be found suitable such as are used as a base for the manufacture of chew gum products, which may perhaps be considered as being suspensions in part. Chew gum base in various compositions, such as are mentioned for instance, in the United States Patent No. 1,930,436, and the copending application No. 424,717, appear to be fit for use as a medium for incorporating calcium salts. After thoroughly mixing concentrated solutions of such salts with such colloidal bases one obtains tough products with, e. g., ten per cent or more by weight of calcium lactate which show an electrolytic conductivity that may be still considerably lower than the conductivity of preparations obtained with amylum syrup. A calcareous taste is correspondingly greatly suppressed. It appears hardly necessary to add that cores of such calcium salts containing chew gum bases may be covered with a sweet coating.

B. Emulsions

I have also found that oil-water and water-oil emulsions are suitable for calcium-containing preparations produced in accordance with my invention. Emulsions, in which water is the disperse phase and oil the continuous medium of dispersion, are satisfactory since each water-salt droplet has a jacket of oil. Of course the (micro) specific conductivity of the salt solution present in the core of every droplet will be high. But this will be in significant contrast with the "macro specific conductivity" of the preparation which will be low and hence satisfy the electrical condition for taste improvement which has been indicated before.

The case of the oil-water type of emulsion in which oil is the disperse phase may also be a satisfactory one, if—in the absence of sourly tasting substances—the water content is kept below 30%, as the salt containing water jackets of the oil droplets are very thin, maybe even of submicroscopical thickness. The mobility of the liquid—and of the ions in it—will then be very much hampered in such submicroscopically thin layers. It may be added that the admixture of isostable lyophilic colloids will also be favourable, and this as well in respect of a stabilisation of the emulsion, as in view of their stiffening effect on said layers.

In the presence of organic acids the requirements as to conductivity, and hence also in respect of the water content of the preparation, may be less severe. The probable reasons for this have been indicated before and I shall return to other aspects of this case presently (under C, below).

In the case of preparations of the emulsion type, the good and the agreeable may be combined in several ways. Thus, for example, the following combination will serve the purpose in view:

30 kilograms refined ground nut oil, or olive oil, and 7 kilograms table vinegar are mixed with 8 kilograms (or more) egg yolk. With this emulsion, which may be thickened and stabilized with some suitable isostable lyophilic colloid, a solution of 1.2 kilograms calcium lactate in a few liters water is thoroughly mixed. The taste of the mayonnaise thus obtained does not differ from preparations in which calcium lactate is absent.

Also other formulae will be suitable for the preparation of mayonnaise as a medium for calcium salts. Apart from taste making properties of substances like egg yolk (or possible additions such as sugar, mustard, pepper), the presence of hydrogen ions will, as mentioned above, be very effective. Besides this the addition of calcium salts to the acid medium may entail a partial fixation of hydrogen ions, and such an addition may therefore lead to a decrease of the electrolytical conductivity of the mayonnaise, instead of this conductivity being enhanced.

C. Preparations which only contain small quantities of colloids

In conformity with what has been set forth before, it may be said that among similarly composed preparations with an equal percentage of calcium compound, that preparation will tend to be the least satisfactory which contains the largest quantity of water. However, the use of acids or acid salts which do not produce a precipitate with dissolved calcium compounds at room temperature (or when the solution is slightly heated) may allow to use a larger percentage of water. For hydrogen ions will not only tend to cover a calcareous taste, and to enhance the solubility of the calcium salt, but I find that these ions moreover slacken considerably the speed of crystallization of supersaturated solutions of calcium compounds. Again, it has been emphasized before that sourly tasting substances allow to mitigate conditions in regard to conductivity limits.

The higher the percentage of water which is used for a preparation with a given concentration of calcium compound, the smaller must be—all other things equal—the percentage of colloid substances that can be mixed. Many hydrophile colloids, however, give rise to a very marked increase of viscosity, even when applied in small quantities. Their thickening effect will tend to mitigate the sourness of the preparation caused by the presence of (organic) acids or acid salts. Such mitigation may further be supported by the use of well known means such as for instance admixtures of sugar. Again, I find that hydrogen ions do not only diminish the chance of segregation of soluble calcium salts from super-saturated solutions, but also of the precipitation of saccharates.

We may now distinguish between two cases (a and b):

(a) Solutions which are only slightly super-saturated, or subsaturated at room temperature in respect of calcium salt.

In this case preparations with a relatively high water percentage may be admissible which, in the presence of acids or acid salts, have admixed only a small percentage of hydrophilic isostable colloids.

Thus a preparation of the following composition—which is given by way of example—will represent a gel in which a calcareous taste is largely eliminated:

Calcium lactate 3%; citric acid 0.2%; gelatine 2%; sugar 4%; water 90.8%. In the case that calcium compounds are used with a less agressive taste—such as the more expensive calcium gluconate—the taste qualities of the product are not or scarcely more satisfactory. In regard to the application of citric acid in the example it may be added that this acid produces a precipitate with calcium salts, when the solution is heated to its boiling point, or thereabout. If, however, such strong heating is avoided, no separation occurs, and at room temperature the solution also keeps quite clear in the long run.

(b) (Super-saturated) solutions with a relatively high concentration of calcium compounds.

In this case the water content of the preparations should be low. But even then one may dispense with the use of large quantities of colloids, and colloids may even be absent entirely. I shall reconsider this point presently (Sub. III below, under which heading some relevant examples are considered).

III. NONCOLLOID SYSTEMS

It should be pointed out that the results which can be obtained by satisfying the conditions, stipulated for media in which sourly tasting substances are absent (viz. large viscosity, low water content and a low electrolytic conductivity of the calcium salt(s) as compared with the conductivity of aqueous solutions of the same calcium compound(s)), may be had to some extent also in the absence of colloids, e. g. by the application of a viscous solvent like glycerine as medium for soluble calcium salts containing organic radicals. I find the solubility of a calcium compound like calcium lactate in liquids like glycerine, or glycol, to be quite marked. Again, I find that the specific electrolytic resistance of solutions of calcium lactate in mixtures of glycerine and water moves in line with their viscosity, and this to such an extent that both physical properties (the viscosity and the specific resistance) of a solution of 9.3% by weight of calcium lactate in 98% glycerine, show a magnitude at room temperature which is more than 1400 times that which applies to an equally concentrated solution of the calcium salt in pure water at the same temperature. It is thus seen that the electrolytic resistance of such preparations is of the same order of size as is the case with calcium salts dissolved in amylum syrups. But the difference should be acknowledged that in the latter case a definite effect on taste and conductivity is obtained at a larger water percentage and in a milder way. These differences, though not of a really basic nature, substantiate the opinion that the obtainable results are dependent also on the kind, structure and degree of subdivision of the applied substances.

Another interesting instance is a preparation showing the following composition: calcium lactate 10%; citric acid 1.5%; saccharose 58.5%; water 30% by weight. This product represents a super saturated solution in respect as well of calcium saccharate, or calcium lactate, as in regard to calcium citrate. Yet, when kept in a closed vessel I find the chance of crystallisation at room temperature is exceedingly small. Though not all the objections which may be raised against the application of concentrated solutions of sugar, are eliminated (thus the preparation, indicated above is too harsh and too sweet for some tastes, the chance for crystallisation is not entirely negligible in open vessels, and the complaint of hygroscopicity remains), it may be said that the main objections are markedly scaled down. It should also be acknowledged that it is rather difficult to obtain concentrated solutions of calcium salts in the viscous syrup without heating to a temperature at which some calcium citrate segregates, unless the citric acid is added after solution of the soluble calcium compound has been completely effected and the mass has been cooled somewhat. But this device is not necessary; by working quickly and cooling subsequently only small quantities of citrate crystals are formed which settle down rather quickly so that the clear liquid may easily be decanted. The stability of the preparation may even be furthered in this way, as the separation of the citrate will tend to take away at the same time other nuclei of crystallisation which may be present. Actually the stability of the viscous preparation is superior to that in which, for instance an equal molar quantity of, for instance acetic acid or of lactic acid is admixed instead of citric acid.

In the case of preparations which are only slightly super-saturated or even sub-saturated, and in presence of sourly tasting substances, the water content may be considerably raised. Owing to the low viscosity of such preparations with considerable water content, and in the absence of colloids, however, the complaint of harshness may be raised to a greater extent than when moderate quantities of hydrophile colloids are present. But the chance of super-saturated solutions to crystallize in closed vessels is—other things being equal—smaller with nongelatinized solutions.

In several parts of the foregoing specification examples have only been given as illustrative instances, showing some ways in which the principles embodying my invention may be applied. The classification of these examples into some groups has only been given in order to make the text more surveyable. Again the possibility for applying transition forms may be obvious. It is evident too that the principles, with which this application deals, may also be beneficial in regard to other substances, the assimilation of which—though being useful for the human body—happens to be largely frustrated, owing to complaints of taste. For the sake of limitation, however, the scope of the claims of this application remains restricted to preparations containing calcium salts.

Though the main object of this invention is the provision of suitable means which entail an approach to a "neutral" taste, preparations will often be preferred in practice which have a positively agreeable taste. In some examples previously given, the good and the agreeable was already combined in several ways, as was specially emphasized when dealing with emulsions. In case of preparations in which glucose is present to a substantial extent, as well as dextrine, the sweet and mild taste of the glucose will itself represent a favourable asset, as well as its nutritive value. Again, when dealing extensively with cases in which acids or acid salts were applied, indications were given to mitigate the effect of such sourly tasting admixtures, inter alia by means of sweetly tasting substances. The means indicated may, however, if desired, favourably be supplemented by the combination with other well tasting and/or flavouring substances which, however, if employed alone, would not yield satisfactory preparations, owing to the unchanged presence of ions in concentrations which impair the taste of the product. Again, calcium-containing preparations when prepared or produced by the method or process of manufacture, as particularly described or ascertained in this specification (or by their obvious chemical equivalents) may be combined with other foodstuffs.

In the claims appended to this specification the term "colloids" is intended to include also semi-colloids.

Various changes may be made in the details disclosed in the foregoing specification without departing from the invention or sacrificing the advantages thereof.

I claim:

1. A health food product, belonging to the ordinary price class of health food, adapted for human consumption several times a day over extended periods and satisfying high requirements as to taste and stability, being a calcium containing non-acidotic preparation which comprises an intimate mixture of at least two per cent of at least one soluble calcium compound containing an organic radical with a viscous medium of dispersion which is unable to enter into chemical combination at a moderate temperature with any calcium compound present to form crystal aggregates, which might irritate the oral tentacles, said mixture having a viscosity of more than 100 times the viscosity of pure water, while the proportion of the total conductivity of the preparation attributable to dissolved calcium compound, multiplied by the equivalent conductivity attributable to the calcium compound in the preparation, is less than $\frac{1}{150}$ of the equivalent conductivity of an aqueous solution of the same calcium compound having the same concentration.

2. The preparation of claim 1, which contains at the most 30% of non-chemically combined water in the mixture.

3. The preparation of claim 1, in which the medium of dispersion is a viscous liquid containing at least one colloid.

4. The preparation of claim 1, in which the medium of dispersion is a viscous liquid containing at least one colloid, while the mixture contains at the most 30% of nonchemically combined water.

5. The preparation of claim 1, in which the medium of dispersion contains at least one substance of the group constituted by colloids and semi-colloids.

6. The preparation of claim 1, in which the medium of dispersion contains at least one substance of the group constituted by colloids and semi-colloids, while the mixture contains at the most 30% of non-chemically combined water.

7. A health food product, belonging to the ordinary price class of health food, adapted for human consumption several times a day over extended periods and satisfying high requirements as to taste and stability, being a calcium containing non-acidotic preparation which comprises at least two per cent of at least one soluble calcium compound containing an organic radical dissolved in a colloid system of the group constituted by water-oil-emulsions and oil-water-emulsions, the medium of dispersion being unable to combine chemically at a moderate temperature with any calcium compound present to form crystal aggregates, which might irritate the oral tentacles, said preparation having a viscosity of more than 100 times the viscosity of pure water, while the proportion of the total conductivity of the preparation attributable to dissolved calcium compound, multiplied by the equivalent conductivity attributable to the calcium compound in the preparation, is less than $\frac{1}{150}$ of the equivalent conductivity of an aqueous solution of the same calcium compound having the same concentration.

8. A health food product, belonging to the ordinary price class of health food, adapted for human consumption several times a day over extended periods and satisfying high requirements as to taste and stability, being a calcium containing non-acidotic preparation which comprises an intimate mixture of not more than 1.5 per cent of acidic constituents, all of which are selected from the group constituted by the innocuous organic acids and acid salts, of at least two per cent of at least one soluble calcium compound containing an organic radical, and of a viscous medium of dispersion, all components being unable to react with each other at moderate temperature under the formation of crystal aggregates, which might irritate the oral tentacles, said mixture having a viscosity of more than 100 times the viscosity of pure water, while the proportion of the total conductivity of the preparation attributable to dissolved calcium compound multiplied by the equivalent conductivity attributable to the calcium compound in the preparation is less than one half of the equivalent conductivity of an aqueous solution of the same calcium compound having the same concentration.

9. The preparation of claim 8, which contains at the most 30% of non-chemically combined water in the mixture.

10. The preparation of claim 8, in which the medium of dispersion is a viscous liquid containing at least one colloid.

11. The preparation of claim 8, in which the medium of dispersion is a viscous liquid containing at least one colloid, while the mixture contains at the most 30% of non-chemically combined water.

12. The preparation of claim 8, in which the medium of dispersion contains at least one substance of the group constituted by colloids and semi-colloids.

13. The preparation of claim 8, in which the medium of dispersion contains at least one substance of the group constituted by colloids and semi-colloids, while the mixture contains at the most 30% of non-chemically combined water.

14. A health food product, belonging to the ordinary price class of health food, adapted for human consumption several times a day over extended periods and satisfying high requirements as to taste and stability, being a calcium containing non-acidotic preparation which comprises at the most 1.5 per cent of acidic constituents, all of which are selected from the group constituted by the innocuous organic acids and acid salts, and at least two per cent of at least one soluble calcium compound containing an organic radical dissolved in a colloidal system of the group constituted by water-oil-emulsions and oil-water-emulsions all components being unable to react with each other at a moderate temperature under the formation of crystal aggregates, which might irritate the oral tentacles, said preparation having a viscosity of more than 100 times the viscosity of pure water, while the proportion of the total conductivity of the preparation attributable to dissolved calcium compound, multiplied by the equivalent conductivity attributable to the calcium compound in the preparation, is less than one half of the equivalent conductivity of an aqueous solution of the same calcium compound having the same concentration.

15. A health food product, belonging to the ordinary price class of health food, adapted for human consumption several times a day over extended periods and satisfying high requirements as to taste and stability, being a calcium-containing non-acidotic preparation which comprises an intimate mixture of at least 2% of at least one soluble calcium compound containing an organic radical, and a viscous medium of dispersion, all components being unable to react with each other at moderate temperatures so as to form crystal aggregates capable of irritating the oral tentacles, said mixture having a viscosity of more than hundred times the viscosity of pure water, while the proportion of the total conductivity of the preparation attributable to dissolved calcium compound, multiplied by the equivalent conductivity attributable to the calcium compound in the preparation, in the absence of acidic constituents is less than $\frac{1}{150}$, and in the presence of acidic constituents is less than $\frac{1}{2}$ of the equivalent conductivity of an aqueous solution of the same calcium compound having the same concentration.

16. The preparation of claim 15, which contains at the most 30% of non-chemically combined water in the mixture.

17. The preparation of claim 15, in which the medium of dispersion is a viscous liquid containing at least one colloid.

L. HAMBURGER.